(12) United States Patent
Yang et al.

(10) Patent No.: US 9,657,761 B2
(45) Date of Patent: May 23, 2017

(54) DOUBLE-PIN NAIL ASSEMBLY

(71) Applicant: Taizhou Dajiang Ind. Co., Ltd., Wenling (CN)

(72) Inventors: Ming-Jun Yang, Wenling (CN); Tao Yang, Wenling (CN); Shang-Shi Cai, Wenling (CN)

(73) Assignee: TAIZHOU DAJIANG IND. CO., LTD., Wenling, Zhejiang Province (CN)

( * ) Notice: Subject to any disclaimer, the term of this patent is extended or adjusted under 35 U.S.C. 154(b) by 0 days.

(21) Appl. No.: 14/882,119

(22) Filed: Oct. 13, 2015

(65) Prior Publication Data

US 2017/0051773 A1   Feb. 23, 2017

(30) Foreign Application Priority Data

Aug. 19, 2015  (CN) .......................... 2015 1 0511737

(51) Int. Cl.
*F16B 15/00* (2006.01)
*F16B 15/08* (2006.01)

(52) U.S. Cl.
CPC .......... *F16B 15/08* (2013.01); *F16B 15/0015* (2013.01)

(58) Field of Classification Search
CPC .. F16B 15/00; F16B 15/0015; F16B 15/0092; F16B 15/06; F16B 15/08
USPC ................................................ 411/457, 471
See application file for complete search history.

(56) References Cited

U.S. PATENT DOCUMENTS

| 274,481 | A | * | 3/1883 | Frost | F16B 15/0015 16/13 |
|---|---|---|---|---|---|
| D30,896 | S | * | 5/1899 | La Prelle | 411/456 |
| 2,111,404 | A | * | 3/1938 | Pankonin | B65D 9/32 206/340 |
| 2,641,154 | A | * | 6/1953 | Heller | F16B 15/04 411/448 |
| 2,867,807 | A | * | 1/1959 | Anstett | F16B 15/0015 206/340 |
| 3,076,373 | A | * | 2/1963 | Matthews | F16B 15/0092 174/159 |
| 3,154,999 | A | * | 11/1964 | Stewart | F16B 15/02 174/159 |

(Continued)

FOREIGN PATENT DOCUMENTS

CN           204061464 U     12/2014

*Primary Examiner* — Roberta Delisle
(74) *Attorney, Agent, or Firm* — Tim Tingkang Xia, Esq.; Locke Lord LLP

(57) ABSTRACT

The present invention relates to a nail assembly having one or more double-pin nails. Each nail includes a nail body and two nail pins extending from the nail body. Each nail pin has a tail end having at least one inclined face formed as a nail edge, where the inclined face is provided with at least one of a concave structure and a convex structure. The concave structure includes one or more grooves, and the convex structure includes one or more tenons. The assembly of double-pin nails having nail pin inclined faces provided with at least one of the concave and convex structures enables, after entering an object, the two nail pins of a double-pin nail are staggered to interlock with each other, thereby effectively connecting the object firmly with a strong anti-pull capability, and having desirable economic and technical benefits.

12 Claims, 4 Drawing Sheets

(56) References Cited

U.S. PATENT DOCUMENTS

| | | | | |
|---|---|---|---|---|
| 3,618,447 | A | * | 11/1971 | Goins ................ F16B 15/0015 264/317 |
| 3,813,985 | A | * | 6/1974 | Perkins .................. F16B 15/00 156/332 |
| 4,697,045 | A | * | 9/1987 | Beatty ................ F16B 15/0015 174/159 |
| 5,441,373 | A | * | 8/1995 | Kish .................. F16B 15/0092 411/258 |
| 5,509,769 | A | | 4/1996 | Larson et al. |
| 5,622,464 | A | | 4/1997 | Dill et al. |
| 6,086,305 | A | | 7/2000 | Lat et al. |
| 6,273,974 | B1 | | 8/2001 | Lat et al. |
| 7,845,889 | B2 | | 12/2010 | Shelton et al. |
| 9,121,427 | B2 | * | 9/2015 | Young ................ F16B 15/0015 |
| 2005/0214095 | A1 | | 9/2005 | Brown et al. |
| 2009/0155020 | A1 | | 6/2009 | Versino et al. |
| 2009/0191023 | A1 | * | 7/2009 | Chang .................... F16B 15/08 411/443 |
| 2015/0063949 | A1 | | 3/2015 | Young |

* cited by examiner

DOUBLE-PIN NAIL ASSEMBLY

CROSS-REFERENCE TO RELATED APPLICATION

This application claims priority to Chinese Patent Application No. 201510511737.4, filed Aug. 19, 2015 in the State Intellectual Property Office of P.R. China, which is hereby incorporated herein in its entirety by reference.

FIELD OF THE INVENTION

The present invention relates generally to a double-pin nail (or staple) assembly, and more particularly, to an assembly of double-pin nails, each double-pin nail having nail pin inclined faces provided with at least one of concave and convex structures, wherein the inclined faces on the two nail pins are adapted so that the two nail pins of the double-pin nail are staggered after entering an object to interlock with each other, thereby connecting the object with a strong anti-pull capability.

BACKGROUND OF THE INVENTION

The background description provided herein is for the purpose of generally presenting the context of the present invention. The subject matter discussed in the background of the invention section should not be assumed to be prior art merely as a result of its mention in the background of the invention section. Similarly, a problem mentioned in the background of the invention section or associated with the subject matter of the background of the invention section should not be assumed to have been previously recognized in the prior art. The subject matter in the background of the invention section merely represents different approaches, which in and of themselves may also be inventions. Work of the presently named inventors, to the extent it is described in the background of the invention section, as well as aspects of the description that may not otherwise qualify as prior art at the time of filing, are neither expressly nor impliedly admitted as prior art against the present invention.

A nail refers to a piece of hard metal having a sharp tip, and is used for fixing an object such as wood and an iron plate. The nail is hammered into an object by using a hammer, and recently, electric nail guns and gas nail guns emerge. The nail can make the object stable since it is hooked on the object by means of the deformation of the nail and a frictional force with the object. There are different shapes of nails because of different usages, and most commonly used nails are referred to as "wire nails", and other commonly used nails are pins, pushpins or brads.

Nail tips of a part of nails available in the market are inclined faces, or a single nail pin is provided with a barb, or a single nail pin of a nail is provided with an inclined face and a barb; however, in an actual using process, merely the single inclined face or single barb structure has a poor connection firmness, is easily pulled out, and cannot effectively ensure connection security of two objects. Similar double-pin nails (stables) are also provided; however, the type of double-pin nails mainly depend on barbs on the two nail pins to implement securing of two connected objects and prevent from being pulled, and there is no securing manner using the two nail pins entering the connected objects and being staggered to secure the connection effect.

Therefore, a heretofore unaddressed need exists in the art to address the aforementioned deficiencies and inadequacies.

SUMMARY OF THE INVENTION

Recently, the inventors have invented a double-pin nail (or stable), as disclosed in Chinese Patent Publication No. CN204061464U, which is hereby incorporated herein in its entirety by reference. The double-pin nail is provided with two nail pins, where the two nail pins are symmetric about a central axis of the double-pin nail. Each tail end of the two nail pins is provided with an inclined face serving as a nail edge. The inclined faces perform a guide function for the double-pin nail to enter an object. The two inclined faces are symmetric about the central axis of the double-pin nail, and each of the two nail pins is provided with at least one barb. Preferably, the barb is formed on an outer side of the double-pin nail. The structure can play a certain function in a suitable condition.

However, according to the present invention, improvements are made by forming at least one of a concave structure and a convex structure on each of the nail pin inclined faces of the double-pin nail. In certain embodiments, the concave structure comprises one or more grooves, while the convex structure comprises one or more tenons. For such configuration, after the groove or tenon formed on the nail pin inclined face enters the object, the groove or tenon on the inclined face forms a certain angle with a pulling direction, so that the anti-pull force is greatly increased, and the anti-pull performance is stronger than that of the conventional nails.

In certain aspects, the present invention provides an assembly of double-pin nails, each double-pin nail having nail pin inclined faces provided with at least one of concave and convex structures, wherein the inclined faces on the two nail pins are adapted so that the two nail pins of the double-pin nail are staggered after entering an object to interlock with each other, thereby connecting the object with a strong anti-pull capability, so as to solve the problems in the prior art of poor connection firmness and weak anti-pull performance.

In one aspect of the present invention, a nail assembly includes one or more double-pin nails. Each double-pin nail comprises a nail body and two nail pins extending from the nail body. Each nail pin has a tail end having at least one inclined face formed as a nail edge. The at least one inclined face is provided with at least one of a concave structure and a convex structure.

In certain embodiments, the concave structure comprises one or more grooves and the convex structure comprises one or more tenons.

In certain embodiments, the one or more grooves and/or the one or more tenons are determined according to a desired design.

In certain embodiments, any adjacent double-pin nails are connected to each other by using an adhesive or by soldering.

In certain embodiments, any adjacent double-pin nails are connected to each other without using a tape or a strip.

In certain embodiments, the two inclined faces at the tail ends of each double-pin nail are symmetric about a central axis of the double-pin nail.

In certain embodiments, the two inclined faces at the tail ends of each double-pin nail are respectively formed at the front side of one nail pin and at the rear side of the other nail pin of the double-pin nail, and are crossing to each other symmetrically, so that after entering an object, the two nail pins are subjected to resistance and guidance of the inclined faces, the nail pins are subjected to forces opposite to the inclined faces so as to change the tracks thereof, and therefore, the two nail pins form a staggered clamping force to enhance the firmness between the double-pin nail and the object.

In certain embodiments, the two inclined faces at the tail ends of each double-pin nail are respectively formed at the left side of one nail pin and the right side of the other nail pin of the double-pin nail, and are opposite to each other symmetrically, so that after entering an object, the two nail pins are subjected to resistance and guidance of the inclined faces, the nail pins are subjected to forces opposite to the inclined faces so as to change the tracks thereof, and therefore, a relative distance between the two nail pins is decreased to enhance the firmness between the double-pin nail and the object.

In certain embodiments, the two inclined faces at the tail ends of each double-pin nail are respectively formed at the right side of one nail pin and the left side of the other nail pin of the double-pin nail, and face each other symmetrically, so that after entering an object, the two nail pins are subjected to resistance and guidance of the inclined faces, the nail pins are subjected to forces opposite to the inclined faces so as to change the tracks thereof, and therefore, the two nail pins stretch and a relative distance between the two nail pins is increased to enhance the firmness between the double-pin nail and the object.

The front side, rear side, left side and right side described in the above description use schematic front views of three embodiments in the accompanying drawings in the specification as reference standards.

Among other things, the present invention has at least the following features and beneficial effects:

(1) The inclined faces on the two nail pins are staggered, and at least one of the concave and convex structures is formed on the inclined face, so that during an actual using process, moving tracks of the nail are respectively deformed under the action of the inclined faces, so as to more effectively connect the object firmly, thereby improving the connection performance of the double-pin nail, and having a significant technical benefit. At the same time, a pull force is greatly increased, and when the nail is pulled out, the concave and/or convex structure on the inclined face forms a certain angle with the force in the pull direction, so that the nail is more difficult to be pulled out.

(2) At least two double-pin nails are assembled together by using an adhesive or by soldering, without using a tape or a strip, so that it is more convenient for being used with a common tool such as an electric nail gun and a gas nail gun.

(3) During movement of the double-pin nail entering the depth of the object, the nail pins are subjected to resistance and guidance of the inclined faces, the nail pins are respectively subjected to extrusion forces in opposite directions of the inclined faces, so that tracks thereof are changed, and therefore, the two nail pins are deformed, for example, a distance between the two nail pins is increased or decreased. In addition, the nail pin is provided with concave and/or convex structures, so that after the nail pins enter a board, under the action of the concave and/or convex structures, the double-pin nail is strongly prevented from exiting; and at the same time, in combination with the concave and/or convex structures on the nail pins, the two structures are staggered to enhance the firmness of the double-pin nail, so that the double-pin nail is difficult to be pulled out, and therefore, the connection between two objects is firmer and more secured.

These and other aspects of the present invention will become apparent from the following description of the preferred embodiment taken in conjunction with the following drawings, although variations and modifications therein may be effected without departing from the spirit and scope of the novel concepts of the invention.

BRIEF DESCRIPTION OF THE DRAWINGS

The accompanying drawings illustrate one or more embodiments of the invention and together with the written description, serve to explain the principles of the invention. Wherever possible, the same reference numbers are used throughout the drawings to refer to the same or like elements of an embodiment.

Figure 1:
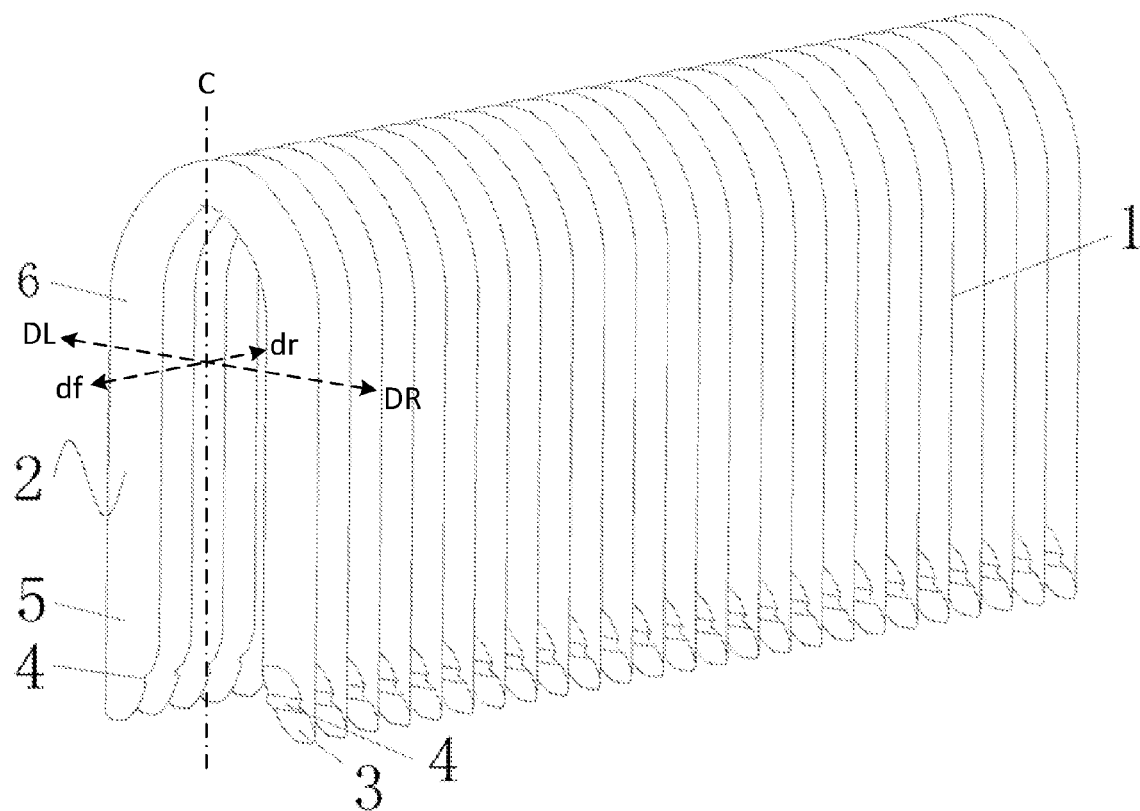
FIG. 1 is a schematic structural diagram of a double-pin nail assembly having nail pin inclined faces provided with concave and/or convex structures according to the present invention.

In the drawings, 1 is referred to a double-pin nail assembly; 2 is referred to a double-pin nail; 3 is referred to an inclined face; 4 is referred to a concave and/or convex structure; 5 is referred to a nail pin; 6 is referred to a nail body; 7 is referred to a upper object; 8 is referred to a lower object; 9 is referred to a tenon; and 10 is referred to a groove.

DETAILED DESCRIPTION OF THE INVENTION

The invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" or "has" and/or "having" when used herein, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom", "upper" or "top," and "front" or "back" may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

The description will be made as to the embodiments of the invention in conjunction with the accompanying drawings in FIGS. 1-8. In accordance with the purposes of this invention, as embodied and broadly described herein, this invention, in one aspect, relates to an assembly of double-pin nails (or stables), each nail having nail pin inclined faces provided with at least one of concave and convex structures, wherein the inclined faces on the two nail pins are adapted so that the two nail pins of the double-pin nail are staggered after entering an object to interlock with each other, thereby connecting the object with a strong anti-pull capability.

Referring to FIG. 1, a schematic structural diagram of a double-pin nail assembly having nail pin inclined faces provided with concave and/or convex structures according to one embodiment of the present invention is shown. A double-pin nail assembly 1 has a plurality of double-pin nails 2. Each double-pin nail 2 has nail pin inclined faces 3 provided with concave and/or convex structures 4. The double-pin nail 2 includes a nail body 6 and two nail pins 5. The nail body 6 and the two nail pins 5 of each double-pin nail 2 define a plane having a front direction df and an opposite, rear direction dr that are perpendicular to the plane. Each tail end of the nail pins 5 is provided with one or more inclined faces 3 served as nail edges. Each inclined face 3 is provided with at least one of concave and convex structures 4. The two nail pins 5 are symmetric about a central axis C of the double-pin nail 2. In certain embodiments, the concave structure 4 includes one or more grooves 10, while the convex structure one or more tenons 9. In the exemplary example shown in FIG. 1, one inclined face (at the lift-hand side) 3 has the concave structure of a groove 10, while the other inclined face (at the right-hand side) 3 has the convex structures 4 of tenon 9. The inclined faces 3 at the tail ends of the left-hand side nail pin 5 (at a left-hand direction DL) and the right-hand side nail pin 5 (at a right-hand direction DR) of each double-pin nail 2 are symmetric about the central axis C of the double-pin nail 2. Any adjacent double-pin nails 2 are connected by using an adhesive or by soldering, without using a tape or a strip as the prior art does, so that it is more convenient for being used with a common tool such as an electric nail gun and a gas nail gun.

Without intent to limit the scope of the present invention, examples and their related results according to the embodiments of the present invention are given below.

Embodiment 1

Figure 2:
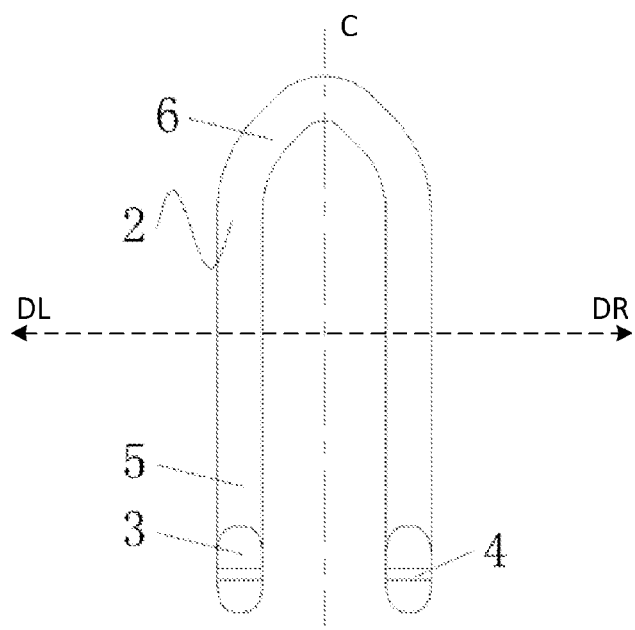
FIG. 2 is a schematic front view of Embodiment 1 of a double-pin nail according to the present invention.
Figure 3:
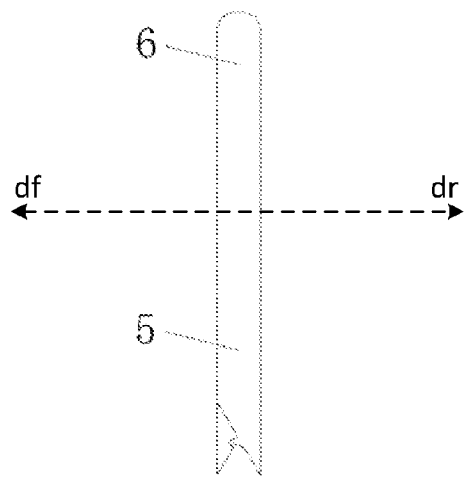
FIG. 3 is a schematic left view of Embodiment 1 of a double-pin nail according to the present invention.

As shown in FIG. 2, the single inclined face 3 at the tail end of the left-hand side nail pin 5 (at the left-hand direction DL) of each double-pin nail 2 faces the front direction, and the single inclined face 3 at the tail end of the right-hand side nail pin 5 (at the right-hand direction DR) of the double-pin nail 2 also faces the front direction. As shown in FIG. 3, the single inclined face 3 at the tail end of the right-hand side nail pin 5 (at the right-hand direction DR) of the double pin nail 2 is formed at the front side (i.e., facing the front direction df), and the single inclined face 3 at the tail end of the left-hand side nail pin 5 (at the left-hand direction DL) of the double-pin nail 2 is formed at the rear side (i.e., facing the rear direction dr), and the two inclined faces 3 at the tail ends of the left-hand side and right-hand side nail pins 5 of the double-pin nail 2 are symmetrical about the plane that is defined by the nail body 6 and the left-hand side and right-hand side nail pins 5 of the double-pin nail 2. After entering an upper object 7 and a lower object 8, the two nail pins 5 are subjected to resistance and guidance of the inclined faces 3, the nail pins 5 are subjected to forces in opposite directions of the inclined faces 3 so as to change the tracks thereof, and therefore, the two nail pins form a staggered clamping force, and the two nail pins 5 are crossed, thereby enhancing the firmness between the upper object 7 and the lower object 8. In another embodiment, the inclined faces 3 may further be respectively formed at the front side of the tail end of one nail pin 5 and at the rear side of the tail end of the other nail pin 5 of the double-pin nail 2.

Figure 4:
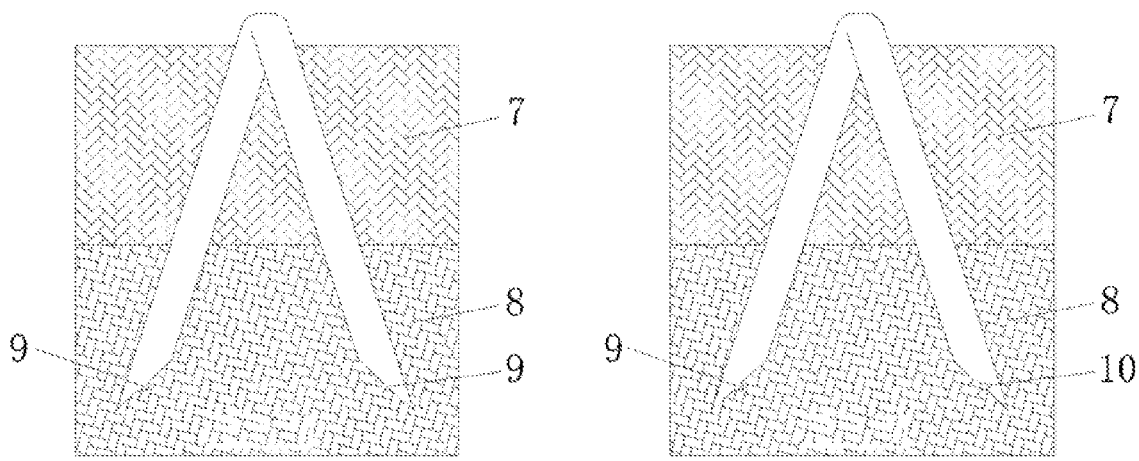
FIG. 4 is a schematic diagram of front side effects of double-pin nails of three different structures in Embodiment 1.
Figure 4:
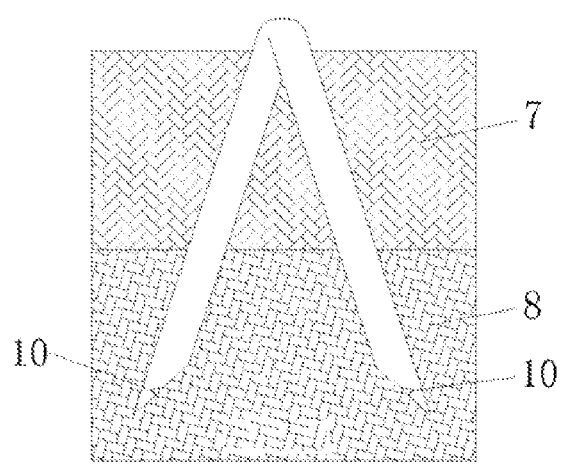

Referring to FIG. 4, a schematic diagram of front side effects of double-pin nails of three different structures in Embodiment 1 is shown. The inclined face 5 is provided with at least one of concave and convex structures 4. There are three examples for the formations of the concave and/or convex structure 4, one is that the front side and the rear side are both grooves 10, one is that the front side and the rear side are both tenons 9, and the other one is that the front side is a tenon 9 and the rear side is a groove 10. By forming the three structures of the concave and/or convex structure 4, after entering the lower object 8, the nail pins 5 strongly prevent, under the action of the tenon 9 or the groove 10, the double-pin nail 2 from exiting; at the same time, in combination with the concave and/or convex structures 4 on the inclined faces 3, the two structures are staggered to generate an interlock force, thereby enhancing the firmness of the double-pin nail 2, so that the double-pin nail 2 is difficult to be pulled out, and the connection between two objects is firmer and more secured. The tenon 9 or the groove 10 is selected to be formed on the two inclined faces 3 according to a design requirement.

Embodiment 2

Figure 5:
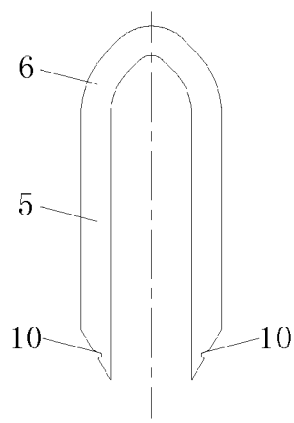
FIG. 5 is a schematic front view of Embodiment 2 of a double-pin nail according to the present invention.

Referring to FIG. 5, a schematic front view of Embodiment 2 of a double-pin nail according to the present invention is shown. The two inclined faces 3 are respectively formed at the left side of one nail pin 5 and at the right side of the other nail pin 5 of the double-pin nail 2, and are opposite to each other symmetrically. After entering the upper object 7 and the lower object 8, the two nail pins 5 are subjected to resistance and guidance of the inclined faces 3, the nail pins 5 are subjected to forces in opposite directions of the inclined faces 3 so as to change the tracks thereof, and therefore, the two nail pins are close to each other, and a relative distance between them is decreased, thereby enhancing the firmness between the upper object 7 and the lower object 8. In another embodiment, the inclined faces 3 may further be respectively formed at the left side of one nail pin 5 and at another side of the other nail pin 5 of the double-pin nail 2.

Figure 6:
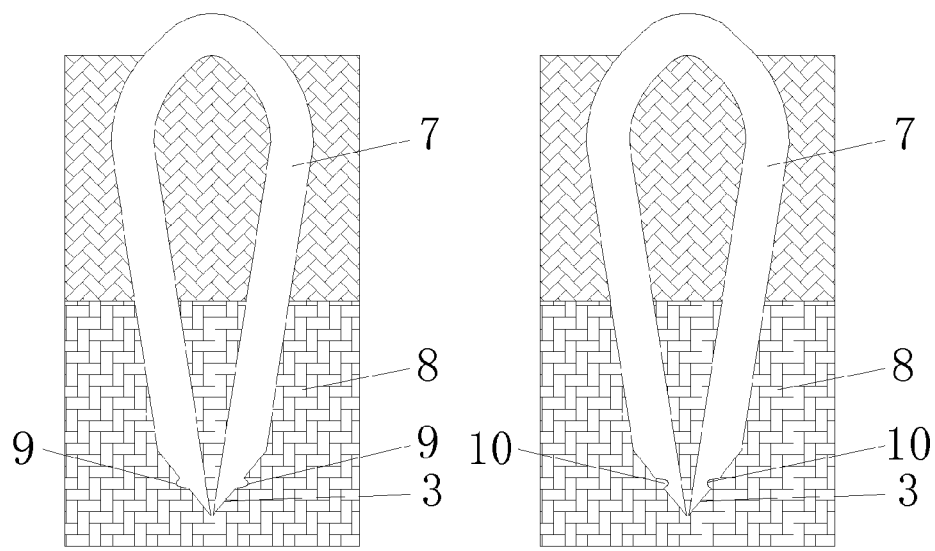
FIG. 6 is a schematic diagram of front side effects of double-pin nails of three different structures in Embodiment 2.
Figure 6:
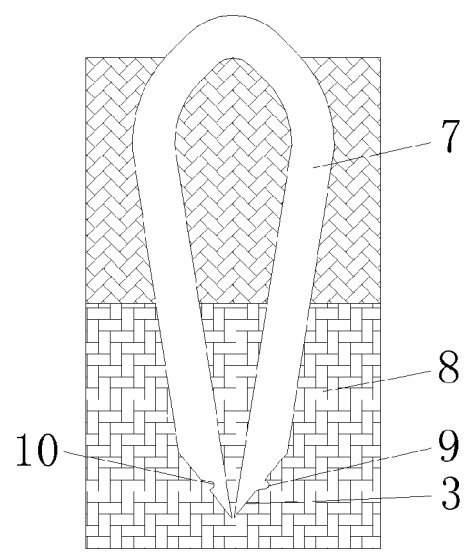

Referring to FIG. 6, a schematic diagram of front side effects of double-pin nails of three different structures in Embodiment 2 is shown. The inclined face 5 is provided with a concave and/or convex structure 4. Three examples for the formation of the concave and/or convex structure 4 are provided, one is that the left side and the right side are both grooves 10, one is that the left side and the right side are both tenons 9, and the other one is that the left side is a tenon 9 and the right side is a groove 10. By forming the three structures of the concave and/or convex structure 4, after entering the lower object 8, the nail pins 5 strongly prevent, under the action of the concave-convex structure 4, the double-pin nail 2 from exiting; at the same time, in combination with the concave and/or convex structures 4 on the inclined faces 3, the two structures are staggered to generate a tension outwards, thereby enhancing the firmness of the double-pin nail 2, so that the double-pin nail 2 is difficult to be pulled out, and the connection between two objects is firmer and more secured. Similarly, the tenon 9 or the groove 10 is selected freely to be disposed on the two inclined faces 3 according to a design requirement.

Embodiment 3

Figure 7:
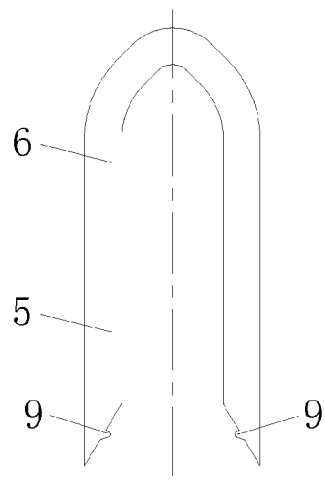
FIG. 7 is a schematic front view of Embodiment 3 of a double-pin nail according to the present invention.

Referring to FIG. 7, a schematic front view of Embodiment 3 of a double-pin nail according to the present invention is shown. The two inclined faces 3 are respectively formed at the right side of one nail pin 5 and at the left side of the other nail pin 5 of the double-pin nail 2, and face each other symmetrically. After entering the upper object 7 and the lower object 8, the two nail pins 5 are subjected to resistance and guidance of the inclined faces 3, the nail pins 5 are subjected to forces in opposite directions of the inclined faces 3 so as to change the tracks thereof, and therefore, the two nail pins move away from each other, and a relative distance between them is increased, thereby enhancing the firmness between the upper object 7 and the lower object 8. In another embodiment, the inclined faces 3 may further be respectively formed at the right side of one nail pin 5 and at another side of the other nail pin 5 of the double-pin nail 2.

Figure 8:
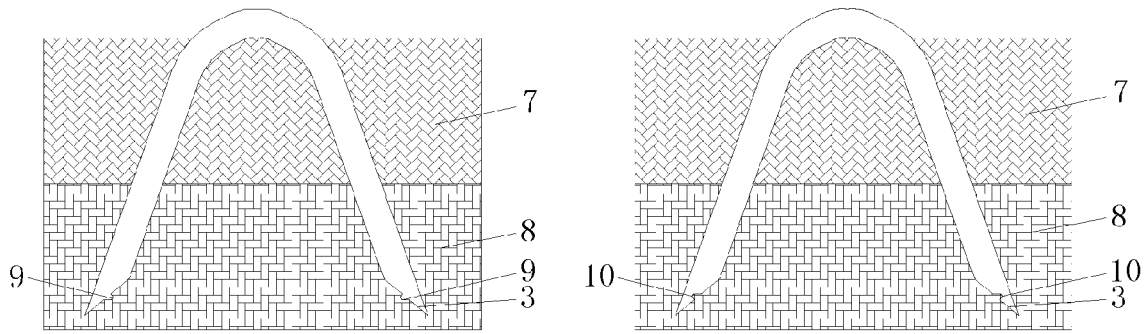
FIG. 8 is a schematic diagram of front side effects of double-pin nails of three different structures in Embodiment 3.
Figure 8:
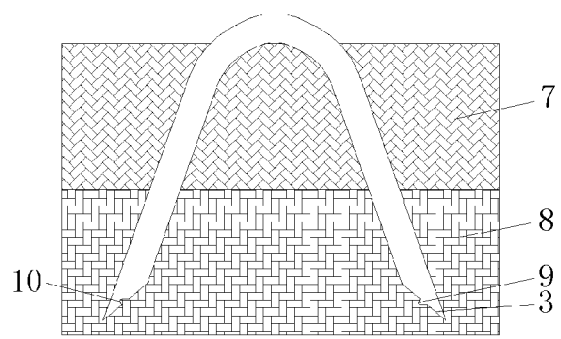

Referring to FIG. 8, a schematic diagram of front side effects of double-pin nails of three different structures in Embodiment 3 is shown. The inclined face 5 is provided with a concave-convex structure 4. There are three examples for the formation of the concave and/or convex structure 4, one is that the left side and the right side are both tenons 9, one is that the left side and the right side are both grooves 10, and the other one is that the right side is a tenon 9 and the left side is a groove 10. By forming the three structures of the concave-convex structure 4, after entering the lower object 8, the nail pins 5 strongly prevent, under the action of the concave-convex structure 4, the double-pin nail 2 from exiting; at the same time, in combination with the concave and/or convex structures 4 on the inclined faces 3, the two structures are staggered to generate a tension inwards, thereby enhancing the firmness of the double-pin nail 2, so that the double-pin nail 2 is difficult to be pulled out, and the connection between two objects is firmer and more secured. The tenon 9 or the groove 10 is selected freely to be disposed on the two inclined faces 3 according to a design requirement.

In sum, according to the present invention, the inclined faces 3 formed on the tail ends of the two nail pins 5 are staggered, and at least one of concave and convex structures 4 is formed on each inclined face 3, so that during an actual using process, moving tracks of the double-pin nail 2 are respectively deformed under the action of the inclined faces 3, so as to more effectively connect the connected object firmly, thereby improving the connection performance of the double-pin nail 2, and having a significant technical benefit. At the same time, a pull force is greatly increased, and when the nail is pulled out, the concave and/or convex structure 4 on the inclined face 3 forms a certain angle with the force in the pull direction, so that the nail is more difficult to be pulled out.

The foregoing description of the exemplary embodiments of the invention has been presented only for the purposes of illustration and description and is not intended to be exhaustive or to limit the invention to the precise forms disclosed. Many modifications and variations are possible in light of the above teaching. Although not explicitly described in the present invention, other embodiments within the scope of the invention and defined by the claims may be obtained by combining, modifying or changing the exemplary embodiments as described in the present invention.

The exemplary embodiments were chosen and described in order to explain the principles of the invention and their practical application so as to activate others skilled in the art to utilize the invention and various exemplary embodiments and with various modifications as are suited to the particular use contemplated. Alternative embodiments will become apparent to those skilled in the art to which the invention pertains without departing from its spirit and scope. Accordingly, the scope of the invention is defined by the appended claims rather than the foregoing description and the exemplary embodiments described therein.

What is claimed is:

1. A nail assembly, comprising:
one or more double-pin nails, wherein each double-pin nail comprises a nail body and two nail pins extending from the nail body, each nail pin having a tail end having a single inclined face formed as a nail edge, the single inclined face being provided with at least one of a concave structure and a convex structure, wherein the nail body and the two nail pins of each double-pin nail define a plane having a front direction and an opposite, rear direction that are perpendicular to the plane, and wherein the single inclined face at the tail end of one nail pin of each double-pin nail faces one of the front and rear directions, and the single inclined face at the tail end of the other nail pin of each double-pin nail faces one of the front and rear directions.

2. The nail assembly according to claim 1, wherein the concave structure comprises one or more grooves and the convex structure comprises one or more tenons.

3. The nail assembly according to claim 2, wherein the one or more grooves and/or the one or more tenons are determined according to a desired design.

4. The nail assembly according to claim 1, wherein the two inclined faces at the tail ends of each double-pin nail are symmetrical about the plane.

5. The nail assembly according to claim 1, wherein adjacent double-pin nails are connected to each other by using an adhesive or by soldering.

6. The nail assembly according to claim 1, wherein adjacent double-pin nails are connected to each other without using a tape or a strip.

7. A nail assembly, comprising:
one or more double-pin nails, wherein each double-pin nail comprises a nail body and two nail pins extending from the nail body, each nail pin having a tail end having a single inclined face formed as a nail edge, the single inclined face being provided with at least one of a concave structure and a convex structure, wherein the nail body and the two nail pins of each double-pin nail define a plane having a front direction and an opposite, rear direction that are perpendicular to the plane, and wherein the single inclined face at the tail end of the left-hand side nail pin of each double-pin nail faces a left-hand direction, and the single inclined face at the tail end of the right-hand side nail pin of each double-pin nail faces a right-hand direction opposite to the left-hand direction, wherein the left-hand and right-hand directions are along the plane and perpendicular to a central axis of each double-pin nail.

8. The nail assembly according to claim 7, wherein the concave structure comprises one or more grooves and the convex structure comprises one or more tenons.

9. The nail assembly according to claim 8, wherein the one or more grooves and/or the one or more tenons are determined according to a desired design.

10. The nail assembly according to claim 7, wherein the two inclined faces at the tail ends of each double-pin nail are symmetric about the central axis of the double-pin nail.

11. The nail assembly according to claim 7, wherein adjacent double-pin nails are connected to each other by using an adhesive or by soldering.

12. The nail assembly according to claim 7, wherein adjacent double-pin nails are connected to each other without using a tape or a strip.

* * * * *